P. D. ROQUEMORE.
Cultivator.

No. 160,353. Patented March 2, 1875.

WITNESSES—
Philip W. Hale,
J. Mason Gozzler

INVENTOR—
Peter D. Roquemore,
by Richards & Hale,
Attorneys.

THE GRAPHIC CO. PHOTO-LITH. 39 & 41 PARK PLACE, N.Y.

UNITED STATES PATENT OFFICE.

PETER D. ROQUEMORE, OF PANOLA COUNTY, TEXAS.

IMPROVEMENT IN CULTIVATORS.

Specification forming part of Letters Patent No. 160,353, dated March 2, 1875; application filed November 9, 1874.

*To all whom it may concern:*

Be it known that I, PETER D. ROQUEMORE, of the county of Panola and State of Texas, have invented certain new and useful Improvements in Combined Plow and Cultivator; and do hereby declare that the following is a full, clear, and exact description thereof, which will enable others skilled in the art to which it pertains to make and use the same, reference being had to the accompanying drawings, and to the letters of reference marked thereon, which form a part of this specification.

My invention consists in the arrangement of five or more plow-standards, with suitable points, in such relation to the plow-beam and handles that the implement may be used for breaking and preparing ground for planting, or as a cultivator which is adjustable to wide apart or close rows, and in the independent adjustability of each of the said standards.

In the following specification and claim I will, with reference to the accompanying drawing, explain in detail the construction and operation of my invention.

Figure 1:
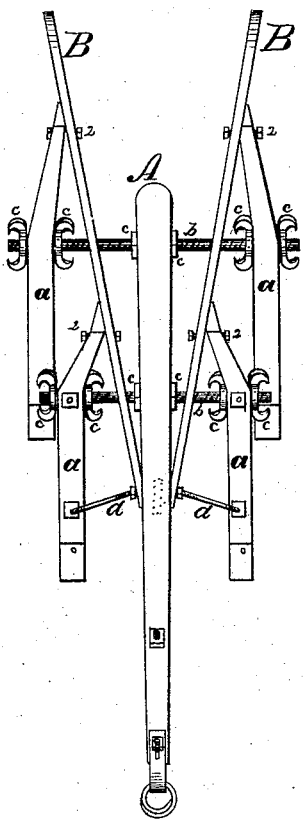
Figure 2:
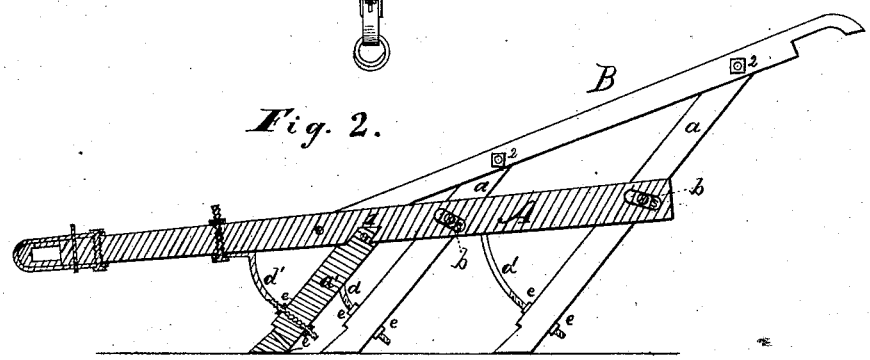
Figure 3:
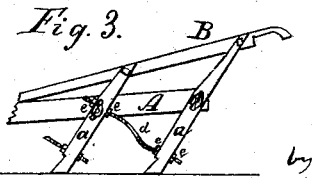

Figure 1 is a perspective view of my combined plow and cultivator. Fig. 2 is a vertical longitudinal section through the center of the beam; Fig. 3, a detail view.

A is the plow-beam, and $a'$ $a$ $a$ $a$ $a$ the adjustable standards, to the feet of which may be affixed any kind of plow-point desired, the central standard $a'$ being pivoted at 1 to the beam, and the side standards $a$ $a$ $a$ $a$ being curved inward slightly at their tops and bolted to the handles B B at 2 2 2 2. $b$ $b$ are the screw-rods, passing through the standards $a$ $a$ $a$ $a$ and slots $s$ $s$ in the beam, for the purpose of adjusting the standards laterally and assisting in their support. $c$ $c$ $c$ $c$ $c$ $c$ $c$ $c$ are adjusting-nuts on the screw-rods at each side of the beam and standards. $d'$ $d$ $d$ $d$ $d$ are rods for bracing the standards and adjusting them vertically. These rods have screws cut upon their ends, and are provided with nuts $e$ $e$ $e$ $e$, &c., by means of which the standards are adjusted vertically.

When it is desired to use the implement for breaking up ground or preparing ground for planting, the central standard $a'$ remains in position, as shown in the drawing, and all the standards may be adjusted by means of the rods $d'$ $d$ $d$ $d$ $d$ to cut deep or shallow furrows. Or the side standards may be adjusted so that a rear plow follows immediately behind the one in front, and cuts deeper a furrow formed by the front plow, being adjusted to so cut by means of the rods $d$ $d$ and screw-rods $b$ $b$. By removing the two forward side plows and adjusting the rear plows to a proper distance apart, the implement may be used to mark off ground for planting, making three furrows at the same time.

When it is desired to use my invention as a cultivator, the central standard $a'$ is removed by taking out the bolt 1 to allow the implement to straddle the rows of corn, cotton, or other plants, and while the rear standards are adjusted to run central furrows between the rows the forward standards may be adjusted to throw up the earth about the roots on each side of the row of plants.

I need not enumerate the various arrangements of the standards for different purposes, as the proper adjustment will be suggested by the use intended.

Having now explained the construction and operation of my invention, I claim and desire to secure by Letters Patent—

The combination of beam A, having diagonal slots $s$ $s$, adjusting-braces $d$, adjusting cross-rods and nuts $b$ $c$, and standards $a$, pivoted to the handles, all arranged and operating substantially as set forth.

In testimony that I claim the foregoing as my own invention I affix hereto my signature in presence of two witnesses.

P. D. ROQUEMORE.

Witnesses:
WM. BEALE HALE,
WM. H. MINNIX.